(12) United States Patent
Lassahn et al.

(10) Patent No.: US 8,351,674 B2
(45) Date of Patent: Jan. 8, 2013

(54) IMAGE PORTION IDENTIFICATION METHODS, IMAGE PARSING METHODS, IMAGE PARSING SYSTEMS, AND ARTICLES OF MANUFACTURE

(75) Inventors: Gordon D. Lassahn, Idaho Falls, ID (US); Gregory D. Lancaster, Idaho Falls, ID (US); William A. Apel, Jackson, WY (US); Vicki S. Thompson, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 1007 days.

(21) Appl. No.: 11/931,787

(22) Filed: Oct. 31, 2007

(65) Prior Publication Data

US 2008/0298667 A1 Dec. 4, 2008

Related U.S. Application Data

(60) Provisional application No. 60/941,025, filed on May 31, 2007.

(51) Int. Cl.
*G06K 9/00* (2006.01)

(52) U.S. Cl. ...................................... 382/133

(58) Field of Classification Search .................. 382/181, 382/289, 290, 295, 198, 305; 436/518, 538, 436/540; 435/7.1, 7.92, 7.93, 971, 973, 975
See application file for complete search history.

(56) References Cited

U.S. PATENT DOCUMENTS

| | | | |
|---|---|---|---|
| 566,558 A | 8/1896 | Bell | |
| 4,542,104 A | 9/1985 | Stryer et al. | |
| 4,880,750 A | 11/1989 | Francoeur | |
| 5,238,652 A | 8/1993 | Sun et al. | |
| 5,270,167 A | 12/1993 | Francoeur | |
| 5,445,934 A | 8/1995 | Fodor et al. | |
| 5,471,549 A * | 11/1995 | Kurosu et al. | 382/290 |
| 5,541,113 A | 7/1996 | Siddigi et al. | |
| 5,605,662 A | 2/1997 | Heller et al. | |
| 5,717,778 A * | 2/1998 | Chu et al. | 382/133 |
| 5,744,305 A | 4/1998 | Fodor et al. | |
| 5,858,801 A | 1/1999 | Brizzolara | |
| 5,885,780 A | 3/1999 | Olivera et al. | |
| 6,103,479 A | 8/2000 | Taylor | |
| 6,249,593 B1 * | 6/2001 | Chu et al. | 382/128 |

(Continued)

FOREIGN PATENT DOCUMENTS

WO    WO 86/02734    5/1986

(Continued)

OTHER PUBLICATIONS

Micromosaic Immunoassays; Bernard et al, Anal Chem 2001,73,8-12.*

(Continued)

*Primary Examiner* — Chan S Park
*Assistant Examiner* — Nancy Bitar
(74) *Attorney, Agent, or Firm* — TraskBritt (57) ABSTRACT

Image portion identification methods, image parsing methods, image parsing systems, and articles of manufacture are described. According to one embodiment, an image portion identification method includes accessing data regarding an image depicting a plurality of biological substrates corresponding to at least one biological sample and indicating presence of at least one biological indicator within the biological sample and, using processing circuitry, automatically identifying a portion of the image depicting one of the biological substrates but not others of the biological substrates.

21 Claims, 6 Drawing Sheets

U.S. PATENT DOCUMENTS

| | | | |
|---|---|---|---|
| 6,553,135 | B1 | 4/2003 | Douglass et al. |
| 6,591,193 | B2* | 7/2003 | Krebs et al. ................ 702/1 |
| 6,591,196 | B1* | 7/2003 | Yakhini et al. ................ 702/28 |
| 6,906,104 | B2 | 6/2005 | Schostarez et al. |
| 6,965,704 | B2 | 11/2005 | Kaushikkar et al. |
| 6,980,677 | B2 | 12/2005 | Niles et al. |
| 6,989,276 | B2 | 1/2006 | Thompson et al. |
| 7,219,016 | B2 | 5/2007 | Rimm et al. |
| 7,682,798 | B2* | 3/2010 | Thompson et al. ........... 435/7.1 |
| 7,695,919 | B2 | 4/2010 | Apel et al. |
| 2002/0168699 | A1* | 11/2002 | Thompson et al. ......... 435/7.92 |
| 2004/0085443 | A1* | 5/2004 | Kallioniemi et al. ......... 348/135 |
| 2005/0047678 | A1* | 3/2005 | Jones et al. ................ 382/294 |
| 2006/0057741 | A1* | 3/2006 | Thompson et al. ........... 436/518 |
| 2006/0115429 | A1 | 6/2006 | Afeyan et al. |
| 2006/0257396 | A1 | 11/2006 | Jacobsen |
| 2008/0300796 | A1* | 12/2008 | Lassahn et al. .............. 702/19 |

FOREIGN PATENT DOCUMENTS

| | | |
|---|---|---|
| WO | WO 90/05296 | 5/1990 |
| WO | WO 97/29206 | 2/1997 |
| WO | WO 98/31839 A2 | 7/1998 |
| WO | WO 98/38490 A1 | 9/1998 |
| WO | WO 99/38985 | 1/1999 |
| WO | 03052422 A1 | 6/2003 |

OTHER PUBLICATIONS

ScanAlyze User Manual; Michael Eisen;1999.*
A M. Francoeur et al., 136 J. Immunol 1648 (1986).
S. Cabilly, Combinatorial Peptide Library Protocols, Humana Press, pp. 129-154 (1997).
G. M. Santangelo et al., Cloning of Open Reading Frames and Promoters from the *Saccharomyces cerevisiae* Genome: Construction of Genomic Libraries of Random Small Fragments, 46 Gene 181-186 (1986).
S.S. Wong, Chemistry of Protein Conjugation and Cross-Linking (CRC Press, entire book, 1991).
N. E. Good & S. Izawa, Hydrogen Ion Buffers, 24 Methods Enzymology 53-68 (1972).
D. M. Kemeny & S. J. Challacombe, ELISA and Other Solid Phase Immunoassays (1988).
R. C. Boguslaski et al., Clinical Immunochemistry: Principles of Methods and Applications (1984).
D. P. Stites et al, Basic and Clinical Immunology (1994).
I. Hemmila, Fluoroimmunoassays and Immunofluorometric Assays, 31 Clin. Chem. 359 (1985).
W. Schramm, et al., Drugs of Abuse in Saliva: A Review, 16 J. Anal. Toxicology 1-9 (1992).
E. J. Cone, Saliva Testing for Drugs of Abuse, 694 Ann. N. Y. Acad. Sci. 91-127 (1995).
D. A. Kidwell et al, Testing for drugs of abuse in saliva and sweat, 713 J. Chrom. B 111-135 (1998).
V. S. Thompson et al., Antibody profiling as an identification tool for forensic samples, 3576 Investigation and Forensic Science Technologies 52-59 (1999).
S. B Karch, Drug Abuse Handbook (CRC Press, 1998).
Parry, Tests for HIV and hepatitis viruses, 694 Annals N.Y Acad. Sci. 221 (1993).
M. Peat & A.E. Davis, Drug Abuse Handbook (CRC Press, Boca Raton, Fla. 1998).
Larry D. Bowers, Ph.D. Athletic Drug Testing, Sport Pharmacology, pp. 299-319 (1998).
Cambridge Healthtech Institute's Fourth Annual, DNA Forensics (Brochure).
Jeffrey Baird, Forensic DNA in the Trial Court 19909-1992: A Brief History, pp. 61-75.
Controversy Over Forensic DNA Analysis, Science in the Courtroom, QC Researcher, pp. 924-925.
John McCabe, DNA Fingerprinting: The Failings of Frye, 16 N. Ill. U. L. Rev. 455 (1996).
International Search Report, dated Feb. 21, 2003.
Thompson et al., "A Novel Test for Detection of Drugs in the Body That Also Provides the Identity of the Person Being Examined," ONDCP International Technology Symposium, Counterdrug Research and Development: Technologies for the Next Decade, San Diego, Jun. 25-28, 2001.
Thompson et al., "Forensic Validation Study of Antibody Profiling Identification," FRENZY—Forensic Science and Crime Scene Technology, Conference and Expo, Washington, D.C., May 14-17, 2001.
Thompson et al., "Novel Assay for Drug and Identity Determination in Body Fluids," American Academy of Forensic Sciences Annual Meeting, Reno, Feb. 22-26, 2000.
Thompson et al., "Antibody Profiling Technique for Rapid Identification of Forensic Samples," CAT/NWAFS/SWAFS/SAT Combined Professional Training Seminar, Las Vegas, Nov. 3-7, 1997.
Thompson et al., "Antibody Profiling Technique for Rapid Identification of Forensic Samples," California Association of Criminalists Fall Seminar, Irvine, California, Oct. 8-11, 1997.
R. M. Bernstein, Cellular Protein & RNA Antigens in Autoimmune Disease, 2 Mol. Biol. Med., 105-120 (1984).
P. S. Fodor, 277 Science 393 & 395 (1997).
S. E. Cwirla et al, Peptides on Phage: A Vast Library of Peptides for Identifying Ligands, 87 Proc. Nat'l Acad. Sci. USA 6378-6382 (1990).
K. S. Lam et al., A New Type of Synthetic Peptide Library for Identifying Ligand-binding Activity, 354 Nature 82-84 (1991).
R. A. Young & R. W. Davis, Yeast RNA Polymerase II Genes: Isolation with Antibody Probes, 222 Science 778-782 (1983).
Thompson and Maragos, Fiber-Optic Immunosensor for the Detection of Fumonisin B1, 44 J. Agric, Food Chem., 1041-1046 (1996).
T. Persoon, Immunochemical Assays in the Clinical Laboratory, 5 Clinical Laboratory Science 31 (1992).
J.K. Leland et al., Electrogenerated Chemiluminescense: An Oxidative-Reduction Type ECL Reactions Sequence Using Triprophyl Amine, 137 J. Electrochemical Soc. 3127-3131 (1990).
David P. Ascher and Chester Roberts, Determination of the Etiology of Seroreversals in HIV Testing by Antibody Fingerprinting, Journal of Acquired Immune Deficiency Syndromes, 6:241-244 (1993) Raven Press, Ltd, NY.
Ann-Michele Francoeur, Antibody Fingerprinting: A Novel Method for Identifying Individual People and Animals, Miragen, Inc., 821-825 (1988).
Thomas F. Unger, PhD and Arthur Strauss, MD FAAP, Individual-Specific Antibody Profiles as a Means of Newborn Infant Identification, Journal of Perinatology vol. 15, No. 2, 152-155 (1995).
James K. Scott and George P. Smith, Searching for Peptide Ligands with an Epitope Library, Science, vol. 249, 386-390 (1990).
James J. Devlin, Lucy C. Panganiban, Patricia E. Devlin, Random Peptide Libraries: A Source of Specific Protein Binding Molecules, Science, vol. 249, 404-406 & 336-337 (1990).
International Search Report and Written Opinion of the International Searching Authority, PCT/US08/65339, International Filing Date May 30, 2008.
International Search Report and Written Opinion of the International Searching Authority, PCT/US08/065321, International Filing Date May 30, 2008.
Caterino-De-Araujo, Adele, et al., "Sensitivity of Two Enzyme-linked Immunosorbent Assay Tests in Relation to Western Blot in Detecting Human T-Cell Lymphotropic Virus Types I and II Infection among HIV-1 Infected Patients from Sao Paulo, Brazil," Diagnostic Microbiology and Infectious Disease, Mar. 1998, vol. 30, No. 3, pp. 173-182.
Agg, Kent M., et al., "Preliminary Investigations into Tris(2,2'-bipyridyl) Ruthenium (III) as a Chemiluminescent Reagent for the Detection of 3,6-Diacetylmorphine (Heroin) on Surfaces," Journal of Forensic Science, Sep. 2007, vol. 52, No. 5, pp. 1111-1114.
Derisi, Joseph L., et al., Exploring the Metabolic and Genetic Control of Gene Expression on a Genomic Scale, Science, Oct. 24, 1997, pp. 680-686, vol. 278.
Unlu, Mustafa, et al., Difference Gel Electrophoresis: A Single Gel Method for Detecting Changes in Protein Extracts, Electrophoresis, 1997, pp. 2071-2077, vol. 18.
Dow, Alasdair I., et al., Automatic Multiparameter Fluorescence Imaging for Determining Lymphocyte Phenotype and Activation Status in Melanoma Tissue Sections, Cytometry, 1996, pp. 71-81, vol. 25.

International Preliminary Report on Patentability for International No. PCT/US2008/065339, dated Dec. 1, 2009.
International Preliminary Report on Patentability for International No. PCT/US2008/054011, dated Sep. 29, 2009.
International Preliminary Report on Patentability for International No. PCT/US2008/065321, dated Dec. 1, 2009.
International Preliminary Examination Report for International No. PCT/US2002/039027, dated Mar. 19, 2004.
Supplementary European Search Report from EP 08 72 9906 dated Mar. 25, 2010; 5 pages.
Sanchez-Carbayo Marta: "Antibody arrays: Technical considerations and clinical applications in cancer," Clinical Chemistry, vol. 52, No. 9, Sep. 2006, pp. 1651-1659.
Bernard et al., "Micromosaic immunoassays," Analytical Chemistry 73, 8-12 (2001).
BioDiscovery, Inc. "ImaGene User Manual," version 7.2006. Retrieved from http://yfgdb.princeton.edu/ImaGeneUserManual.pdf on Nov. 6, 2009.
Eisen, M. "ScanAlyze User Manual," 1999, Retrieved from http://rana.lbl.gov/manuals/ScanAlyzeDoc.pdf on Nov. 6, 2009.
International Search Report and Written Opinion of the International Searching Authority, PCT/US08/54011, International Filing Date Feb. 14, 2008.
Miragen Antibody Profile Assay Advertisement, 1996.

* cited by examiner

IMAGE PORTION IDENTIFICATION METHODS, IMAGE PARSING METHODS, IMAGE PARSING SYSTEMS, AND ARTICLES OF MANUFACTURE

CROSS-REFERENCE TO RELATED APPLICATIONS

This application claims the benefit of U.S. Provisional Patent Application Ser. No. 60/941,025, which was filed May 31, 2007, and which is incorporated by reference herein. The subject matter of this application is also related to U.S. application Ser. No. 10/017,577, filed Dec. 14, 2011, now U.S. Pat. No. 6,989,276, issued Jan. 24, 2006; U.S. application Ser. No. 11/101,216, filed Apr. 6, 2005, now U.S. Pat. No. 7,682,797, issued Mar. 23, 2010; U.S. application Ser. No. 11/691,096, filed Mar. 26, 2007, now U.S. Pat. No. 7,695,919, issued Apr. 13, 2010; and U.S. application Ser. No. 11/932,029, filed Oct. 31, 2007, abandoned.

CONTRACTUAL ORIGIN OF THE INVENTION

This invention was made with government support under Contract No. DE-AC07-051D14517 awarded by the United States Department of Energy. The government has certain rights in the invention.

TECHNICAL FIELD

The present disclosure relates to image portion identification methods, image parsing methods, image parsing systems, and articles of manufacture.

BACKGROUND OF THE DISCLOSURE

Various methods of identification of people are known. For example, fingerprints and DNA may be used to identify people. Antibodies may also be used to uniquely identify a person. At least some aspects of the disclosure are directed toward processing of biological samples of an individual, for example, to identify the individual.

BRIEF DESCRIPTION OF THE DRAWINGS

Preferred embodiments of the disclosure are described below with reference to the following accompanying drawings.

FIG. 4 is a block diagram illustrating components of an image that depicts a plurality of biological substrates, according to one embodiment.

DETAILED DESCRIPTION

This disclosure of the invention is submitted in furtherance of the constitutional purposes of the U.S. Patent Laws "to promote the progress of science and useful arts." (Article 1, Section 8).

According to some embodiments of the disclosure, systems, apparatus, and methods for processing biological samples are described, for example, in processing of biological samples including antibodies of one or more biological subjects. Other details regarding processing of antibodies of a biological subject are described in U.S. Pat. No. 6,989,276 and U.S. patent application Ser. No. 11/932,029, filed Oct. 31, 2007, abandoned, and titled "Biological Analysis Methods, Biological Analysis Devices, and Articles of Manufacture," assigned to the assignee hereof, the teachings of which are incorporated herein by reference.

In one embodiment, systems, apparatus, and methods for parsing an image depicting biological substrates that have been exposed to biological samples into a portion of the image depicting one of the biological substrates but not others of the biological substrates are described. The biological substrates may convey information regarding biological indicators present in the biological samples. Additional aspects of the disclosure are described in the illustrative embodiments below.

According to one embodiment, an image portion identification method comprises accessing data regarding an image depicting a plurality of biological substrates corresponding to at least one biological sample and indicating presence of at least one biological indicator within the at least one biological sample, and, using processing circuitry, automatically identifying a portion of the image depicting one of the biological substrates of the plurality but not others of the biological substrates of the plurality.

According to another embodiment, an image parsing method comprises arranging a plurality of biological substrates, creating an image depicting the arranged plurality of biological substrates after the arranging, and automatically parsing the image into a sub-image depicting a number of arranged biological substrates which is less than a number of the arranged plurality of biological substrates.

According to yet another embodiment, an article of manufacture comprises media comprising programming configured to cause processing circuitry to perform processing. The processing comprises accessing data regarding an image depicting a plurality of biological substrates corresponding to at least one biological sample and indicating a presence of at least one biological indicator within the at least one biological sample, and automatically identifying a portion of the image depicting a number of the plurality of biological substrates which is less than a number of the plurality of biological substrates depicted in the image.

According to another additional embodiment, an image parsing system comprises circuitry configured to access data regarding an image depicting a plurality of biological substrates corresponding to at least one biological sample and indicating a presence of at least one biological indicator within the at least one biological sample and to automatically identify a portion of the image depicting less than all of the plurality of biological substrates depicted within the image.

According to still another embodiment, an image parsing system comprises a device configured to receive a plurality of biological substrates, an image capture tool configured to create an image depicting the plurality of biological substrates, which is arranged using the device, and circuitry configured to provide data regarding a sub-image depicting less than all of the arranged plurality of biological substrates.

Information about a biological subject may be obtained from a biological sample provided by the biological subject. The biological sample may include biological indicators, such as antibodies. A biological substrate comprising biological receptors may be exposed to the biological sample. Consequently, the biological receptors of the biological substrate may react with the biological indicators of the biological sample. As a result of the reactions, portions of the biological substrate may change color, thereby creating markings on the biological substrate that may convey information regarding the biological indicators present in the biological sample.

Figures 1A, 1B, 1C:
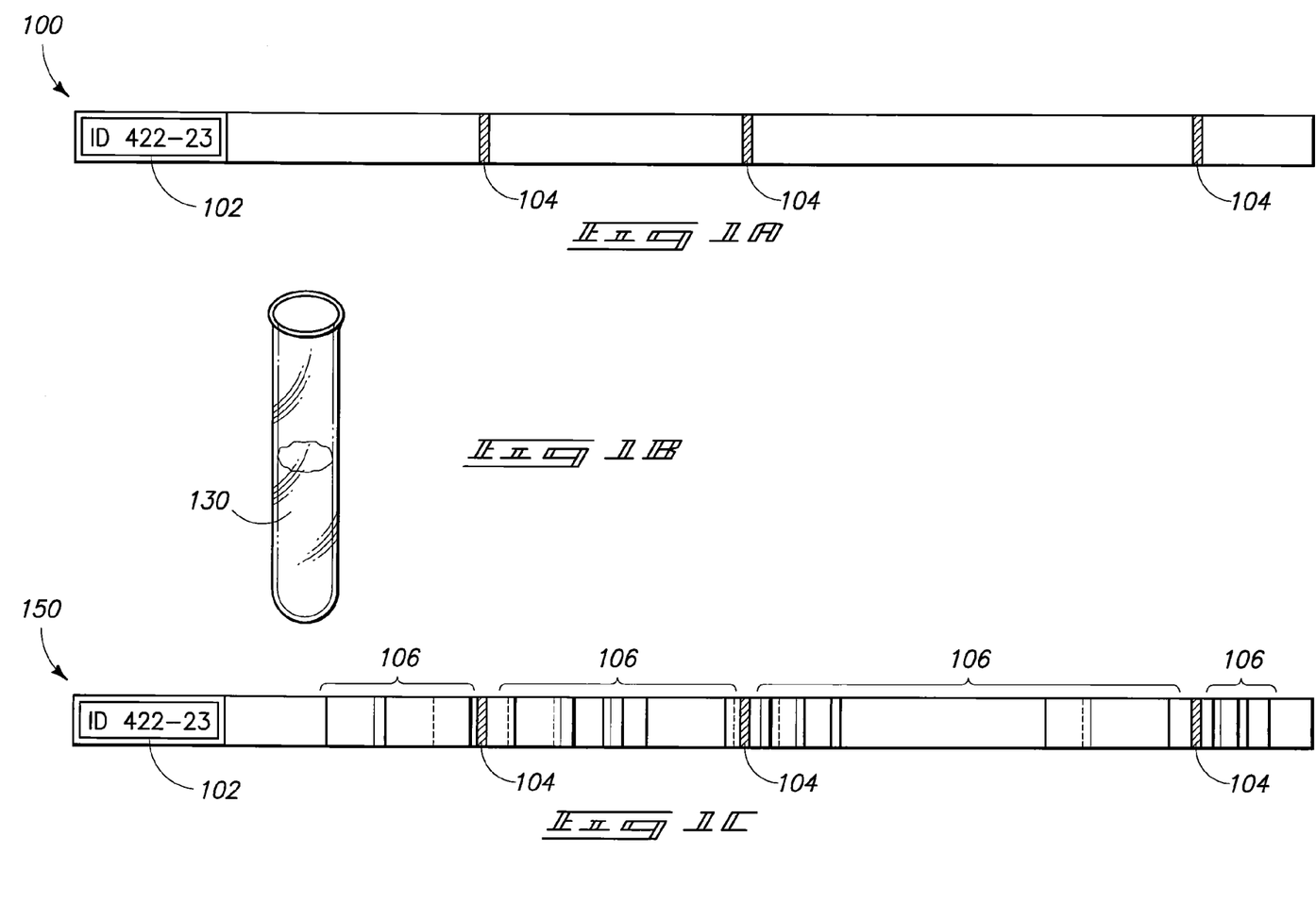
FIG. 1A is an illustrative representation of a blank biological substrate according to one embodiment.
FIG. 1B is an illustrative representation of a biological sample according to one embodiment.
FIG. 1C is an illustrative representation of a marked biological substrate according to one embodiment.

Referring to FIG. 1A, a blank biological substrate 100 according to one embodiment is illustrated. Substrate 100 may include a label 102. Label 102 may be used to distinguish substrate 100 from other substrates. For example, label 102 may include an identifier that uniquely identifies substrate 100, such as a number, bar code, or combination of alphanumeric characters. Substrate 100 may also include reference marks 104 at predetermined positions on substrate 100. Reference marks 104 may be used to align substrate 100 with another substrate in order to compare substrate 100 with the other substrate.

Substrate 100 may include a plurality of antigens attached to portions of a surface of substrate 100. The antigens may be deposited on substrate 100 in a particular predetermined arrangement. For example, the antigens may be deposited in rows and columns arranged so that antigens deposited within a single column are of a same antigen type and so that the antigen type varies from column to column. In this manner, the antigens deposited in a particular column may be of a same type but the antigens deposited in a particular row may have different types.

As illustrated in FIG. 1A, substrate 100 may be rectangular and may have antigens deposited thereon in rows and columns. Of course, other substrate shapes may be used. Furthermore, biological matter, other than antigens, configured to react with a biological sample may be deposited on substrate 100. For example, nucleic acid probes or gene probes may be deposited on substrate 100. Substrate 100 may be referred to as a blank biological substrate because substrate 100 has not yet been exposed to a biological sample with which the antigens of substrate 100 may react.

Referring to FIG. 1B, a biological sample 130 according to one embodiment is illustrated. Sample 130 may be a biological sample taken from a biological subject (e.g., a human) that contains biological indicators such as antibodies. For example, biological sample 130 may include blood, serum, saliva, urine, semen, perspiration, tears, body tissues, or other biological material containing antibodies.

FIG. 1C illustrates a marked biological substrate 150, according to one embodiment, representing substrate 100 after substrate 100 has been exposed to sample 130. Substrate 150 includes a plurality of markings 106 created by reactions between antibodies present in sample 130 and the antigens deposited on substrate 150. Markings 106 may be indicative of immune complexes (i.e., antigen/antibody combinations) present on substrate 150 after substrate 150 has been exposed to sample 130 and, thus, may be indicative of antibodies present in sample 130. Portions of substrate 150 that are not marked may be indicative of antigens attached to substrate 150 for which a matching antibody was not present in sample 130.

A combination of antibodies within an individual may be unique to the individual. Accordingly, samples taken from different individuals may result in substrates having different markings. The markings resulting from exposure to a sample from a particular person may be uniquely associated with the particular person. Upon creating several marked biological substrates, such as substrate 150, it may be desirable to capture the information conveyed by the markings on the substrates in an image.

Figures 2A, 2B:
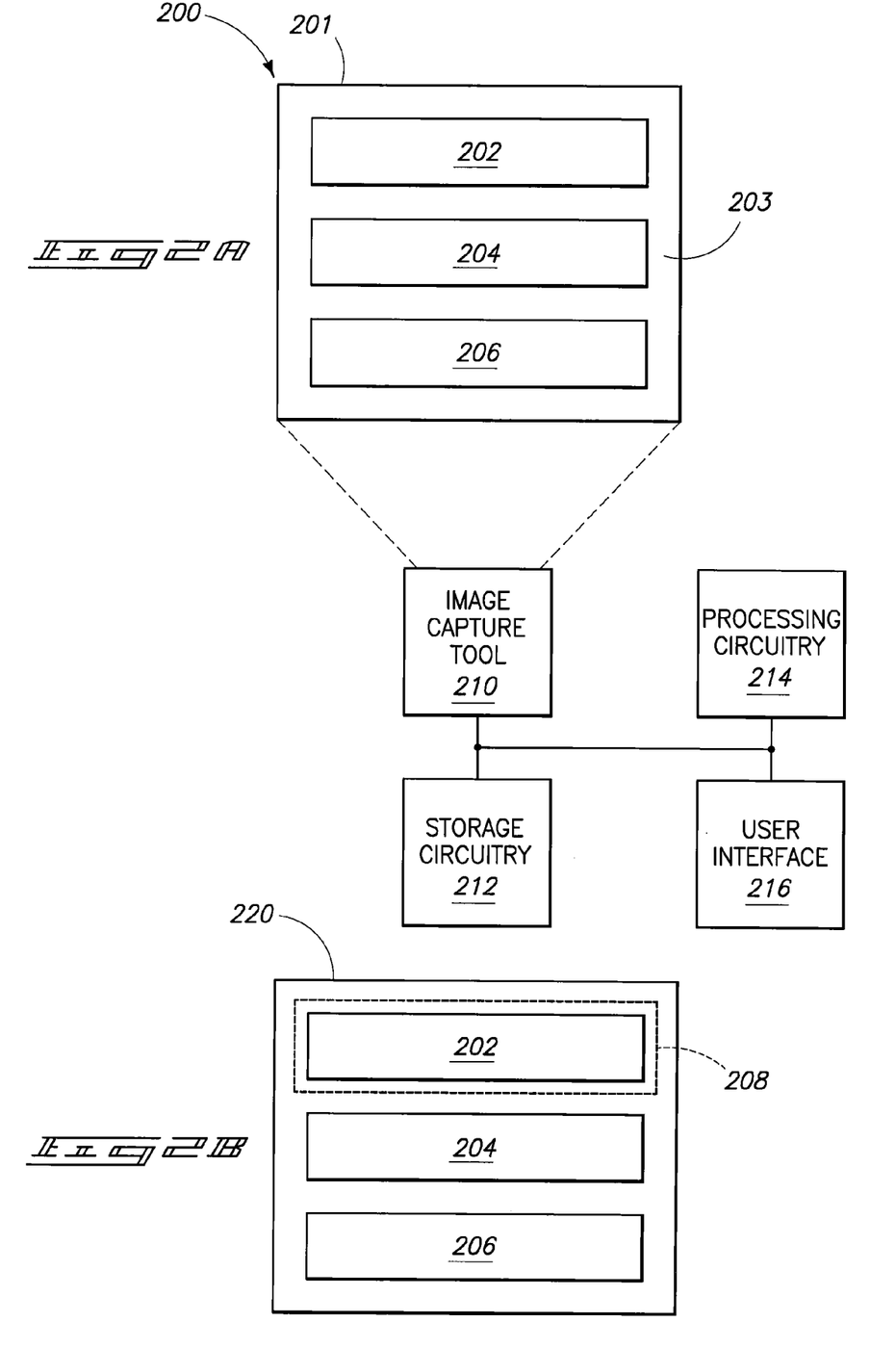
FIG. 2A is a block diagram of an image parsing system according to one embodiment.
FIG. 2B is a block diagram of an image depicting a plurality of biological substrates according to one embodiment.

FIG. 2A illustrates an image parsing system 200 including a device 201 used to receive substrates 202, 204, and 206 while an image capture tool 210 creates an image of substrates 202, 204, and 206. System 200 also includes storage circuitry 212, processing circuitry 214, and a user interface 216.

Image capture tool 210 may be a scanner, camera, or other tool capable of capturing an image. Image capture tool 210 may generate a single image that depicts one or more of substrates 202, 204, and 206. In one embodiment, device 201 may receive substrates 202, 204, and 206 and keep the substrates in place while image capture tool 210 creates the image.

Device 201 may receive a plurality of substrates, such as substrates 202, 204, and 206, while a single image is captured that depicts the plurality of substrates. Capturing a single image depicting substrates 202, 204, and 206 and then parsing the single image into a sub-image depicting substrate 202, a sub-image depicting substrate 204, and a sub-image depicting substrate 206 may be more efficient and/or more desirable than capturing individual images of substrates 202, 204, and 206 in some implementations.

In one embodiment, device 201 is configured to receive substrates 202, 204, and 206 and arrange the substrates 202, 204, and 206 to be imaged by image capture tool 210. In one embodiment, device 201 includes a substrate receiving surface 203, which may be configured to receive substrates 202, 204, and 206 and may be rigid or semi-rigid. For example, substrate receiving surface 203 may be metal, plastic, cardboard, stiff paper, or other similar material. Substrate receiving surface 203 may have a color that is different from a background color of substrates 202, 204, and 206. For example, substrate receiving surface 203 may be black if substrates 202, 204, and 206 have a white color prior to being exposed to a biological sample to provide contrast between the color of substrate receiving surface 203 and the background color of substrates 202, 204, and 206. In one embodiment, the color of device 201 may be uniform throughout at least portions of device 201 that are exposed to image capture tool 210. Other configurations of device 210 other than a substrate receiving surface may be used.

Placing substrates 202, 204, and 206 in device 201 may involve using adhesive such as tape or glue in one embodiment. Alternatively, device 201 may include physical features that position substrates 202, 204, and 206 without adhesive such as clips, detents, cutouts, ridges, frames, ribs, spacers, grooves, notches, openings, slots, and the like, at desired locations of substrate receiving surface 203.

In some embodiments, device 201 may provide substrates 202, 204, and 206 into a particular arrangement. For example, device 201 may provide substrates 202, 204, and 206 to be parallel to one another upon substrate receiving surface 203. Device 201 may additionally or alternatively position substrates 202, 204, and 206 so that there is a predetermined amount of space between the substrates 202, 204, and 206. Device 201 may retain substrates 202, 204, and 206 in the particular arrangement while image capture tool 210 captures an image depicting substrates 202, 204, and 206.

FIG. 2B illustrates an image 220 captured by image capture tool 210 that depicts substrates 202, 204, and 206. In other embodiments, individual images 220 may include one substrate, two substrates, or three or more substrates. In addition, image 220 may depict all or portions of substrate receiving surface 203. Image capture tool 210 may store digital data of images in storage circuitry 212.

Storage circuitry 212 may be embodied in a number of different ways using electronic, magnetic, optical, electromagnetic, or other techniques for storing information. Some specific examples of storage circuitry include, but are not limited to, a portable magnetic computer diskette, such as a floppy diskette, zip disk, hard drive, Random Access Memory (RAM), Read Only Memory (ROM), Flash memory, cache memory, and/or other configurations capable of storing programming, data, or other digital information.

At least some embodiments or aspects described herein may be implemented using programming stored within appropriate processor-usable media and/or communicated via a network or other transmission media and configured to control appropriate processing circuitry. For example, programming may be provided via appropriate media including, for example, embodied within articles of manufacture or embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy. The programming also may be provided via a communications interface, or by using other appropriate communications structure or medium. Exemplary programming including processor-usable code may be communicated as a data signal embodied in a carrier wave, in but one example.

In one embodiment, processing circuitry 214 may access image 220 by retrieving image 220 from storage circuitry 212. Alternatively, image capture tool 210 may provide data of image 220 directly to processing circuitry 214. Processing circuitry 214 may automatically parse image 220 into a sub-image depicting fewer substrates than depicted in original image 220 (e.g., only one of substrates 202, 204, and 206 is depicted in a sub-image in one embodiment). Processing circuitry 214 may present a parsed version of image 220 (i.e., a sub-image) to a user via user interface 216, store the parsed version, and/or output the parsed version externally of system 200.

Processing circuitry 214 may comprise circuitry configured to implement desired programming provided by appropriate media in at least one embodiment. For example, processing circuitry 214 may be implemented as one or more of a processor and/or other structure configured to execute executable instructions including, for example, software and/or firmware instructions, and/or hardware circuitry. Exemplary embodiments of processing circuitry 214 include hardware logic, PGA, FPGA, ASIC, state machines, and/or other structures alone or in combination with a processor. These examples of processing circuitry 214 are for illustration; other configurations are possible.

In one embodiment, processing circuitry 214 may execute programming to implement functionality described herein including accessing data of images and processing the data including, for example, parsing the images.

Figure 3:
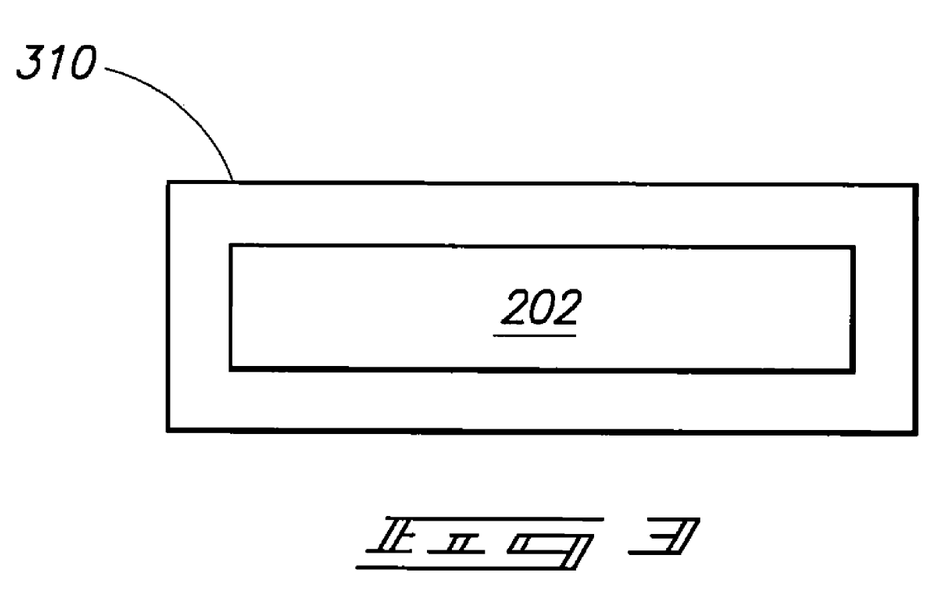
FIG. 3 is a block diagram illustrating an image comprising one biological substrate according to one embodiment.

FIG. 3 illustrates a parsed version of image 220 (i.e., a sub-image) which corresponds to boundary 208 (illustrated as a set of dashed lines) in FIG. 2B that delineates a portion of image 220 depicting substrate 202, but not substrate 204 or substrate 206. In some embodiments, processing circuitry 214 may automatically determine boundary 208 without human intervention. The portion delineated by boundary 208 may be used to form a parsed version of image 220. Image 310 of FIG. 3 is an image derived from image 220 using boundary 208. Image 310 is a sub-image of image 220, since image 310 is a portion of image 220 enclosed by boundary 208 as depicted in FIG. 2B. Processing circuitry 214 may save image 310 in storage circuitry 212.

Processing circuitry 214 may subsequently determine additional boundaries surrounding substrates 204 and 206, respectively, and create sub-images using additional boundaries. In this manner, image 220 may be parsed into three sub-images: one depicting substrate 202, one depicting substrate 204, and one depicting substrate 206, in one example, where each sub-image depicts only one substrate.

In one embodiment, processing circuitry 214 may present boundary 208 to a user via user interface 216 prior to creation and/or storage of image 310. Doing so may give the user an opportunity to adjust boundary 208. In this embodiment, the user may adjust or replace boundary 208 by using a computer pointer device (mouse or other device) to edit boundary 208.

In some embodiments, processing circuitry 214 may store auxiliary information along with parsed images, such as image 310. The auxiliary information may include, for example, a time and date when the substrate depicted in the parsed image was created, a name of the laboratory where the depicted substrate was created, a name of a technician who created the depicted substrate, a substrate lot number of the depicted substrate, names of other files that may be related to the depicted substrate, and/or supporting information regarding the origin of the biological sample used to create the depicted substrate.

Processing circuitry 214 may use one or more of a number of different methods to automatically parse image 220 including identifying boundary 208 without user intervention. According to one method, processing circuitry 214 first determines one of a plurality of possible arrangements of the substrates 202, 204, and 206 in image 220. For example, if the substrates 202, 204, and 206 are arranged parallel to each other, processing circuitry 214 may, in one embodiment, determine whether the substrates 202, 204, and 206 are arranged horizontally or vertically. To do so, processing circuitry 214 may first determine brightness values for rows and columns of image 220. The brightness values may be based on color component images of image 220. Further details regarding the determination of the orientation of the substrates are described below.

FIG. 4 illustrates three color component images 402, 404, and 406 for image 220. Component image 402 may represent the red content of image 220, component image 404 may represent the green content of image 220, and component image 406 may represent the blue content of image 220. Processing circuitry 214 may determine component brightness values for each of the pixels of component image 402 by finding the absolute value of a difference between each individual pixel value and a background color of component image 402. The background color may be determined by creating a histogram of pixel values of component image 402 and selecting the most common pixel value as the background color. Processing circuitry 214 may similarly determine component brightness values for each of the pixels of component images 404 and 406.

Next, processing circuitry 214 may determine an average component brightness value for each individual row of component image 402 by averaging the component brightness values of the pixels in the individual row to determine a single average component brightness value representing an individual row. Similarly, processing circuitry 214 may determine an average component brightness value for individual columns of component image 402 by averaging the component brightness values of the pixels in the individual column to determine a single average component brightness value representing an individual column. Consequently, processing circuitry 214 will have determined an array of row component brightness values and an array of column component brightness values representative of component image 402.

Processing circuitry 214 may similarly determine an array of row component brightness values and an array of column component brightness values representative of component image 404 and an array of row component brightness values and an array of column component brightness values representative of component image 406. Processing circuitry 214 may then average the arrays of row component brightness values from component images 402, 404, and 406 to determine a single array of row brightness values representative of image 220 and may then average the arrays of column component brightness values from component images 402, 404, and 406 to determine a single array of column brightness values representative of image 220.

Figure 5:
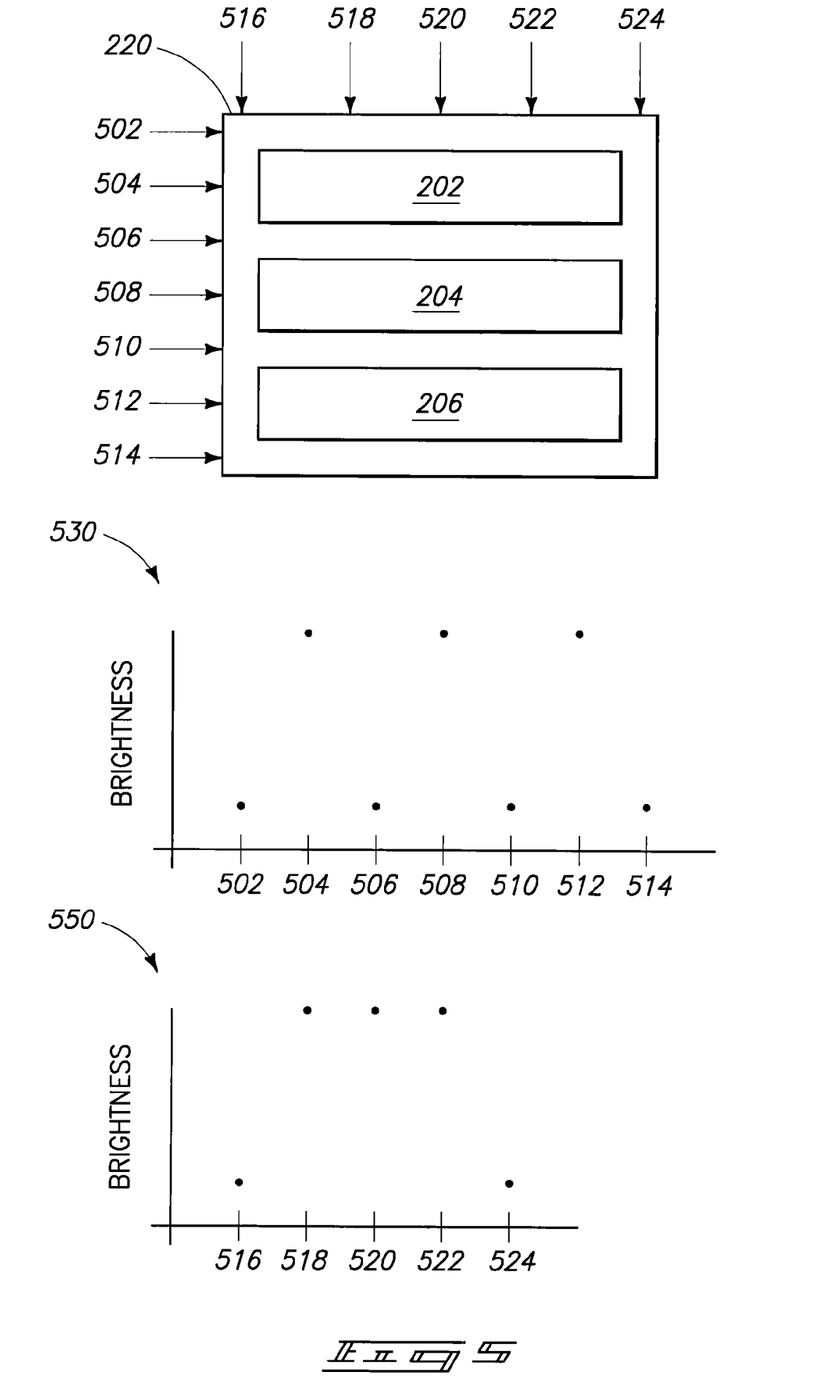
FIG. 5 illustrates a block diagram of an image depicting a plurality of biological substrates as well as charts illustrating brightness values of the image, according to one embodiment.

FIG. 5 illustrates example row positions (502, 504, 506, 508, 510, 512 and 514) and example column positions (516, 518, 520, 522, and 524) of image 220 and illustrates example row brightness values of image 220 in chart 530 and example column brightness values of image 220 in chart 550.

Since row 502 does not intersect substrate 202, and therefore comprises pixels depicting device 201, row 502 may have a relatively low brightness value since the values of the pixels of row 502 are close to the background color, which in some embodiments is presumably the color of surface 203 of device 201. Accordingly, chart 530 illustrates that the brightness value for row 502 is relatively low. Similarly, rows 506, 510, and 514 also have relatively low brightness values since these rows do not intersect substrates 202, 204, or 206.

In contrast, row 504 intersects substrate 202. Accordingly, row 504 comprises pixels depicting portions of substrate 202. Row 504 may have a relatively high brightness value since the values of the pixels of row 504 are presumably very different from the background color since the color of device 201 may be chosen to contrast with the predominant color of substrate 202 in one embodiment. Accordingly, chart 530 illustrates that the brightness value for row 504 is relatively high. Similarly, rows 508 and 512 also have relatively high brightness values since these rows intersect substrates 204 and 206 respectively.

Column 516 does not intersect substrate 202, 204, or 206 and may therefore have a relatively low brightness value. Accordingly, chart 550 illustrates that the brightness value for column 516 is relatively low. Similarly, column 524 may also have a relatively low brightness value since column 524 do not intersect substrate 202, 204, or 206. However, columns 518, 520, and 522 intersect substrates 202, 204, and 206. Accordingly, chart 550 illustrates that the brightness values for these columns is relatively high.

Figure 6:
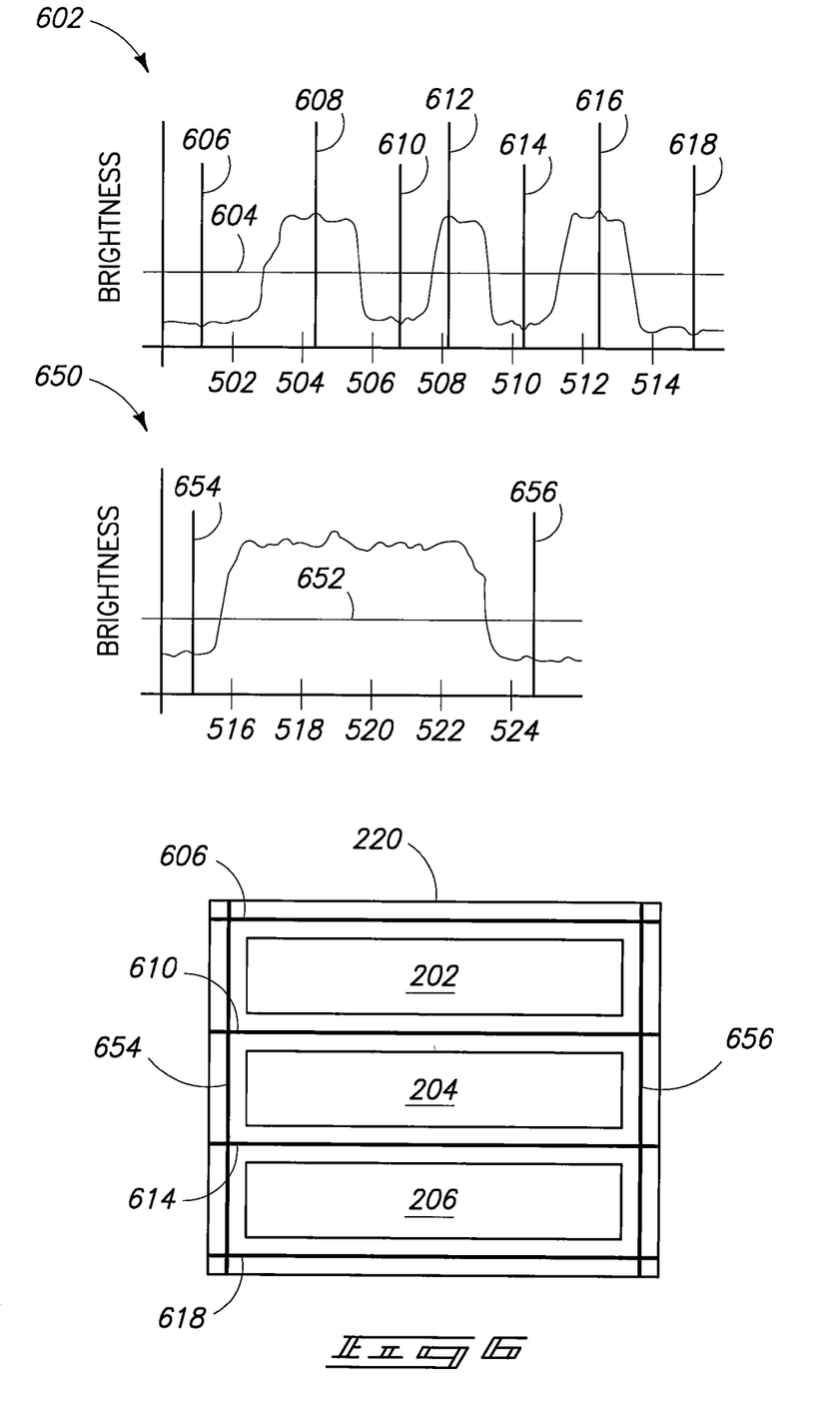
FIG. 6 illustrates charts depicting brightness values as well as a block diagram of an image depicting a plurality of biological substrates, according to one embodiment.
Figure 11:
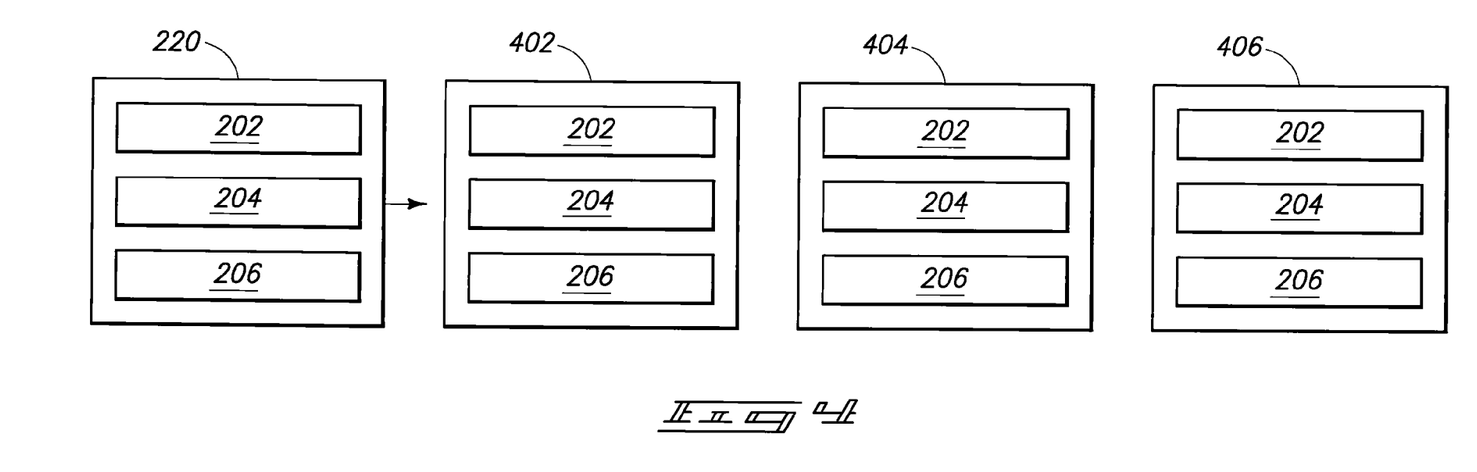

Chart 530 illustrates a few of the row brightness values of image 220 and chart 550 illustrates a few of the column brightness values of image 220. However, additional data could be added to charts 530 and 550 so that all of the row brightness values of image 220 are depicted in chart 530 and all of the column brightness values of image 220 are depicted in chart 550. For example, chart 602 of FIG. 6 illustrates all of the row brightness values of image 220 and chart 650 of FIG. 6 illustrates all of the column brightness values of image 220.

Processing circuitry 214 may use statistical characteristics of the array of row brightness values and the array of column brightness values to determine one of a plurality of possible arrangements of the substrates in the image. For example, in one embodiment, processing circuitry 214 may determine whether the substrates 202, 204, and 206 depicted in image 220 are arranged horizontally or vertically. In one embodiment, processing circuitry 214 may determine a cumulative distribution function (CDF) for the array of row brightness values and a CDF for the array of column brightness values.

Processing circuitry 214 may then compare characteristics of the row CDF with characteristics of the column CDF. For example, in one embodiment, processing circuitry 214 may, from the row CDF, determine a first brightness value representing a first probability, a second brightness value representing a second probability and a third brightness value representing a third probability. Processing circuitry 214 may then form a first ratio of a difference between the second value and the first value and a difference between the third value and the first value. Processing circuitry 214 may also determine brightness values using the first, second, and third probabilities from the column CDF and then form a second ratio using the same formula as the first ratio but using the brightness values from the column CDF. In one embodiment, the first probability may be 2%, the second probability may be 90%, and the third probability may be 98%.

Processing circuitry 214 may then compare the first ratio to the second ratio. If the first ratio is less than the second ratio, processing circuitry 214 may determine that the substrates are oriented horizontally, and if the first ratio is greater than the second ratio, processing circuitry 214 may determine that the substrates are oriented vertically.

Once processing circuitry 214 had determined the arrangement of the substrates, processing circuitry 214 may select one of a plurality of different search schemes usable to parse image 220 into one or more sub-images. For example, once processing circuitry 214 has determined that the substrates are oriented horizontally in image 220, processing circuitry 214 may determine rows separating substrates 202, 204, and 206 from each other.

FIG. 6 includes charts 602 and 650 depicting values used to determine the separating rows and includes image 220 annotated to depict the separating rows. Rows 606 and 610 of image 220 isolate substrate 202, rows 610 and 614 isolate substrate 204, and rows 614 and 618 isolate substrate 206.

To determine the positions of rows 606, 610, 614, and 618, processing circuitry 214 may first calculate a cutoff value 604. In one embodiment, processing circuitry 214 calculates cutoff value 604 by determining a CDF for a smoothed version of the row brightness values. Next, processing circuitry 214 determines a first brightness value representing a first probability and a second brightness value representing a second brightness value. Processing circuitry 214 then calculates the cutoff value 604 as being the sum of the first brightness value and the product of a constant and the difference between the second brightness value and the first brightness value. In one embodiment, the first probability is 2%, the second probability is 98%, and the constant is 0.6.

Once the cutoff value 604 has been calculated, processing circuitry 214 scans the array of row brightness values to find a local minimum followed by a local maximum followed by a local minimum. In one embodiment, processing circuitry 214 may scan the array of row brightness values in order, either from the bottom of the image to the top of the image or from the top of the image to the bottom of the image. If the two local minima are below the cutoff value 604, and the local maximum is above the cutoff value 604, the positions of the local minima are used as the separating rows. As is depicted in chart 602, row 606 is a local minimum below the cutoff, row 608 is a local maximum above the cutoff, and row 610 is a local minimum below the cutoff. Accordingly, rows 606 and 610 are separating rows that separate substrate 202 from substrates 204 and 206. Processing circuitry 214 may similarly determine that rows 612 and 616 are local maximums above the cutoff and rows 614 and 618 are local minimums below the cutoff, and may further determine that rows 610 and 614 are separating rows for substrate 204 and rows 614 and 618 are separating rows for substrate 206.

In some embodiments, processing circuitry 214 may also determine separating columns 654 and 656 such that substrates 202, 204, and 206 are located between the separating columns 654 and 656. To determine the separating columns 654 and 656, processing circuitry 214 may calculate a cutoff value 652 equal to a weighted average of the average over a column number of a smoothed version of the array of column brightness values and a background gray brightness.

For contiguous segments of the smoothed array of column brightness values with values that are less than the cutoff value 652, processing circuitry 214 may use a center of a segment as one of the separating columns. Since columns that intersect the substrates 202, 204, and 206 should have brightness values above the cutoff, there will be two separating columns, one to the left of the substrates 202, 204, and 206 (separating column 654), and one to the right of the substrates 202, 204, and 206 (separating column 656).

Once the separating rows and separating columns have been determined, processing circuitry 214 may use the separating rows and columns to form boundaries, such as boundary 208, which contains one of the three substrates 202, 204, and 206 and then, as was described above, create sub-images using the boundaries.

Of course, the method described above for determining separating rows and columns may be used if the substrates 204, 206, and 208 are arranged vertically rather than horizontally by interchanging the words "column" and "row" in the above description.

In some embodiments, a user may utilize user interface 216 to eliminate spurious marks from image 220 prior to processing circuitry 214 parsing image 220 by replacing the spurious marks with a background color such as the color of device 200. Furthermore, a user may utilize user interface 216 to eliminate one or more substrates 204, 206, or 208 from image 220 prior to processing circuitry 214 parsing image 220 if the substrates 204, 206, or 208 depicted in image 220 are too close together.

Although the method described above for parsing an image into portions is described with respect to images depicting biological substrates, the method may be more generally applied to images depicting items other than biological substrates if the items depicted have a color or brightness that is different from the background color of the image.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, applicants consider the disclosure to include, disclose and describe methods that include fewer, more and/or alternative steps than those methods explicitly disclosed as well as an apparatus that includes fewer, more and/or alternative structures than the explicitly disclosed structures.

The invention claimed is:

1. An image portion identification method, comprising:
   accessing data regarding an image depicting a plurality of biological substrates corresponding to at least one biological sample and indicating presence of at least one biological indicator within the biological sample, wherein each biological substrate of the plurality includes a plurality of biological receptors; and
   using processing circuitry, automatically identifying a portion of the image depicting one biological substrate of the plurality but not biological substrates of the plurality other than the one biological substrate, wherein the identifying the portion comprises:
      determining at least one of a plurality of possible vertical arrangements and horizontal arrangements of the plurality of biological substrates of the image; and
      selecting one of a plurality of different search schemes usable to identify the portion responsive to the determining.

2. The method of claim 1, wherein the identifying comprises identifying the portion of the image depicting only the one biological substrate of the plurality of biological substrates.

3. The method of claim 1, wherein the automatically identifying comprises identifying a boundary of the portion of the image without user input.

4. The method of claim 1, wherein the plurality of biological substrates comprise markings corresponding to the at least one biological sample, the markings denoting the presence of the at least one biological indicator within the at least one biological sample.

5. An image portion identification method, comprising:
   accessing data regarding an image depicting a plurality of biological substrates corresponding to at least one biological sample and indicating presence of at least one biological indicator within the biological sample, wherein each biological substrate of the plurality includes a plurality of biological receptors; and
   using processing circuitry, automatically identifying a portion of the image depicting one biological substrate of the plurality but not biological substrates of the plurality other than the one biological substrate, wherein the identifying the portion comprises:
      determining either that the plurality of biological substrates are arranged horizontally or that the plurality of biological substrates are arranged vertically;
      if the plurality of biological substrates are arranged horizontally, identifying a first row of pixels of the image and a second row of pixels of the image, the one biological substrate being the only biological substrate of the plurality that is located between the rows; and
      if the plurality of biological substrates are arranged vertically, identifying a first column of pixels of the image and a second column of pixels of the image, the one biological substrate being the only biological substrate of the plurality located between the columns.

6. The method of claim 5, wherein the determining comprises:

for individual rows of pixels of the image, calculating a row brightness value for each of the individual rows of pixels;

calculating a row cumulative distribution function of the row brightness values of the individual rows of pixels;

for individual columns of pixels of the image, calculating a column brightness value for each of the individual columns of pixels;

calculating a column cumulative distribution function of the column brightness values of the individual columns; and comparing characteristics of the row and column cumulative distribution functions.

7. The method of claim 6, wherein the determining comprises using statistical characteristics of the row brightness values to determine whether the plurality of biological substrates are arranged horizontally or vertically.

8. The method of claim 5, wherein the identifying the first row of pixels and the second row of pixels comprises:

for individual rows of pixels of the image, calculating a brightness value for the individual row;

calculating a cutoff value using statistical characteristics of the row brightness values of the individual rows;

identifying the first row of the image, the brightness value associated with the first row being less than the cutoff value;

identifying the second row of the image, the brightness value associated with the second row being less than the cutoff value; and identifying a third row of the image intersecting the one substrate, the third row being positioned within the image below the first row and above the second row, the brightness value associated with the third row being greater than the cutoff value and being a local maximum with respect to others of the row brightness values.

9. An image parsing method, comprising:

arranging a plurality of biological substrates wherein each biological substrate of the plurality includes a plurality of biological receptors;

creating an image depicting the arranged plurality of biological substrates after the arranging; and automatically parsing the image into a sub-image depicting a number of biological substrates of the plurality that is less than a total number of the arranged plurality of biological substrates by determining one of a plurality of possible different horizontal arrangements and vertical arrangements of the plurality of biological substrates and selecting one of a plurality of different search schemes usable to identify the sub-image responsive to the determining.

10. The method of claim 9, wherein the automatically parsing comprises parsing the image into the sub-image depicting only one biological substrates of the arranged plurality of biological substrates.

11. The method of claim 9, wherein the automatically parsing comprises automatically parsing without user input.

12. The method of claim 9, wherein the arranging comprises arranging the plurality of biological substrates in a specific arrangement and the creating the image comprises creating the image while the plurality of biological substrates are arranged in the specific arrangement.

13. The method of claim 9, wherein the arranging comprises arranging the plurality of biological substrates on a surface having a uniform color contrasting with a background color of the plurality of biological substrates.

14. The method of claim 9, wherein the plurality of biological substrates comprise markings corresponding to at least one biological sample, the markings denoting the presence of biological indicators within the at least one biological sample.

15. An article of manufacture, comprising:

non-transitory media comprising programming configured to cause processing circuitry to perform processing comprising:

accessing data regarding an image depicting a plurality of biological substrates corresponding to at least one biological sample and indicating presence of at least one biological indicator within the at least one biological sample, wherein each biological substrate of the plurality includes a plurality of biological receptors; and automatically identifying a portion of the image depicting a number of the plurality of biological substrates that is less than a total number of the plurality of biological substrates depicted in the image by determining one of a plurality of possible horizontal arrangements and vertical arrangements of the substrates in the image and selecting one of a plurality of different search schemes usable to identify the portion of the image responsive to the determining.

16. The article of manufacture of claim 15, wherein the processing further comprises creating a new image comprising only the identified portion of the image.

17. The article of manufacture of claim 15, wherein the plurality of biological substrates comprise markings corresponding to biological samples, the markings denoting the presence of biological indicators within the biological samples.

18. The article of manufacture of claim 17, wherein the plurality of biological substrates comprise antigens and the biological indicators comprise at least one antibody.

19. An image parsing system, comprising:

circuitry configured to:

access data regarding an image depicting a plurality of biological substrates corresponding to at least one biological sample and indicating presence of at least one biological indicator within the at least one biological sample, wherein each biological substrate of the plurality includes a plurality of biological receptors; and automatically identify a portion of the image depicting less than all the biological substrates of the plurality of biological receptors depicted within the image by determining one of a plurality of possible horizontal arrangements and vertical arrangements of the plurality of biological substrates in the image and selecting one of a plurality of different search schemes usable to identify the portion responsive to the determining.

20. The system of claim 19, wherein the circuitry is configured to create a new image comprising the identified portion, the new image depicting one biological substrate of the plurality but not others of the plurality of biological substrates.

21. The system of claim 19, wherein the plurality of biological substrates comprise markings corresponding to biological samples, the markings denoting the presence of biological indicators within the biological samples.

* * * * *

UNITED STATES PATENT AND TRADEMARK OFFICE
CERTIFICATE OF CORRECTION

PATENT NO. : 8,351,674 B2  Page 1 of 1
APPLICATION NO. : 11/931787
DATED : January 8, 2013
INVENTOR(S) : Gordon D. Lassahn et al.

It is certified that error appears in the above-identified patent and that said Letters Patent is hereby corrected as shown below:

In the claims:
CLAIM 10, COLUMN 11, LINE 53,  change "substrates of the" to --substrate of the--

Signed and Sealed this
Third Day of November, 2015

Michelle K. Lee
*Director of the United States Patent and Trademark Office*